United States Patent
Ejzak et al.

(10) Patent No.: US 7,295,843 B2
(45) Date of Patent: Nov. 13, 2007

(54) SERVER COMPONENT NETWORK RESOURCE ALLOCATION FOR HANDOFF BETWEEN MOBILE SWITCHING CENTER PACKET-SWITCHED PORTION AND MOBILE SWITCHING CENTER CIRCUIT-SWITCHED PORTION

(75) Inventors: Richard Paul Ejzak, Wheaton, IL (US); Thomas Lee McRoberts, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 803 days.

(21) Appl. No.: 10/600,914

(22) Filed: Jun. 20, 2003

(65) Prior Publication Data

US 2004/0259549 A1    Dec. 23, 2004

(51) Int. Cl.
*H04Q 7/20* (2006.01)

(52) U.S. Cl. .................................. 455/442; 370/352

(58) Field of Classification Search ................ 455/432, 455/435, 422, 442; 370/352, 332
See application file for complete search history.

(56) References Cited

U.S. PATENT DOCUMENTS

| | | | |
|---|---|---|---|
| 6,490,451 B1 * | 12/2002 | Denman et al. | 455/436 |
| 7,031,747 B2 * | 4/2006 | Cyr et al. | 455/552.1 |
| 2003/0027569 A1 * | 2/2003 | Ejzak | 455/432 |
| 2003/0040331 A1 * | 2/2003 | Zhao | 455/552 |

* cited by examiner

*Primary Examiner*—Creighton Smith (57) ABSTRACT

An apparatus in one example comprises a server component that sends one or more signals to cause an allocation of one or more network resources for an active call terminated to a mobile telephone upon initiation of a handoff. The handoff is between a packet-switched portion of a mobile switching center and a circuit-switched portion of a mobile switching center. The one or more network resources provide a translation between the packet-switched portion of the mobile switching center and the circuit-switched portion of the mobile switching center.

20 Claims, 6 Drawing Sheets

SERVER COMPONENT NETWORK RESOURCE ALLOCATION FOR HANDOFF BETWEEN MOBILE SWITCHING CENTER PACKET-SWITCHED PORTION AND MOBILE SWITCHING CENTER CIRCUIT-SWITCHED PORTION

CROSS-REFERENCE TO RELATED APPLICATIONS

This application contains subject matter that is related to the subject matter of the following applications, which is assigned to the same assignee as this application. The below-listed applications are hereby incorporated herein by reference in their entirety.

"INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER," by Cyr, et al., Ser. No. 10/295,774, filed Nov. 14, 2002; and "COMMUNICATION BETWEEN USER AGENTS THROUGH EMPLOYMENT OF CODEC FORMAT UNSUPPORTED BY ONE OF THE USER AGENTS," by Ejzak, et al., Ser. No. 10/295,775, filed Nov. 14, 2002.

TECHNICAL FIELD

The invention relates generally to communications and more particularly to wireless communications.

BACKGROUND

Current wireless communication systems provide the ability for users to communicate to and from wireless or mobile users. There are generally two types of wireless communication systems, circuit-switched ("CS") and packet-switched ("PS").

In typical circuit-switched wireless communication systems, the mobile switching center ("MSC") connects the landline public switched telephone network ("PSTN") system to the wireless communication system. The mobile switching center is typically split into an mobile switching center server and a media gateway ("MGW"), and incorporates the bearer independent call control ("BICC") or the integrated services digital network user part ("ISUP") call control protocol for call delivery between mobile switching centers.

The current approach to introducing internet protocol ("IP") multimedia services for universal mobile telecommunications service ("UMTS") and code division multiple access ("CDMA") third generation ("3G") systems is to define a brand new internet protocol multimedia subsystem ("IMS"), comprised of a set of internet protocol connected network entities within the internet protocol multimedia subsystem using packet-switched services. These network entities provide internet protocol multimedia features and services using the session initiation protocol ("SIP") as the primary vehicle for call control.

The legacy circuit-switched communication system works with the internet protocol multimedia system to provide a more convenient upgrade path from the legacy circuit-switched communication system. The combined system provides packet-switched functionality to an existing circuit-switched communication system.

The gradual process of upgrading legacy circuit-switched communication systems to packet-switched communication systems creates a communication system where legacy circuit-switched portions and packet-switched portions co-exist. As a user of a mobile telephone roams between legacy circuit-switched communication systems and packet-switched communication systems, handoffs must occur to maintain an active call.

Thus, a need exists for a communication system with both packet-switched portions and legacy circuit-switched portions that can hand off an active call between the packet-switched portions and the legacy circuit-switched portions.

SUMMARY

The invention in one embodiment encompasses an apparatus. The apparatus comprises a server component that sends one or more signals to cause an allocation of one or more network resources for an active call terminated to a mobile telephone upon initiation of a handoff. The handoff is between a packet-switched portion of a mobile switching center and a circuit-switched portion of a mobile switching center. The one or more network resources provide a translation between the packet-switched portion of the mobile switching center and the circuit-switched portion of the mobile switching center.

Another embodiment of the invention encompasses a method. A handoff of an active call to a mobile telephone between a packet-switched portion of a mobile switching center and a circuit-switched portion of a mobile switching center is performed. A signal is sent to cause an allocation of one or more network resources that provide a translation between the packet-switched portion of the mobile switching center and the circuit-switched portion of the mobile switching center. A handback of the active call between the packet-switched portion of the mobile switching center and the circuit-switched portion of the mobile switching center is performed. A signal is sent to cause a release of one or more of the one or more network resources.

A further embodiment of the invention encompasses an article. The article comprises one or more computer-readable signal-bearing media. The article includes means in the one or more media for performing a handoff of an active call to a mobile telephone between a packet-switched portion of a mobile switching center and a circuit-switched portion of a mobile switching center. The article includes means in the one or more media for sending a signal to cause an allocation of one or more network resources that provide a translation between the packet-switched portion of the mobile switching center and the circuit-switched portion of the mobile switching center. The article includes means in the one or more media for performing a handback of the active call between the packet-switched portion of the mobile switching center and the circuit-switched portion of the mobile switching center. The article includes means in the one or more media for sending a signal to cause a release of one or more of the one or more network resources.

DESCRIPTION OF THE DRAWINGS

Features of exemplary implementations of the invention will become apparent from the description, the claims, and the accompanying drawings in which:

DETAILED DESCRIPTION

Figure 1:
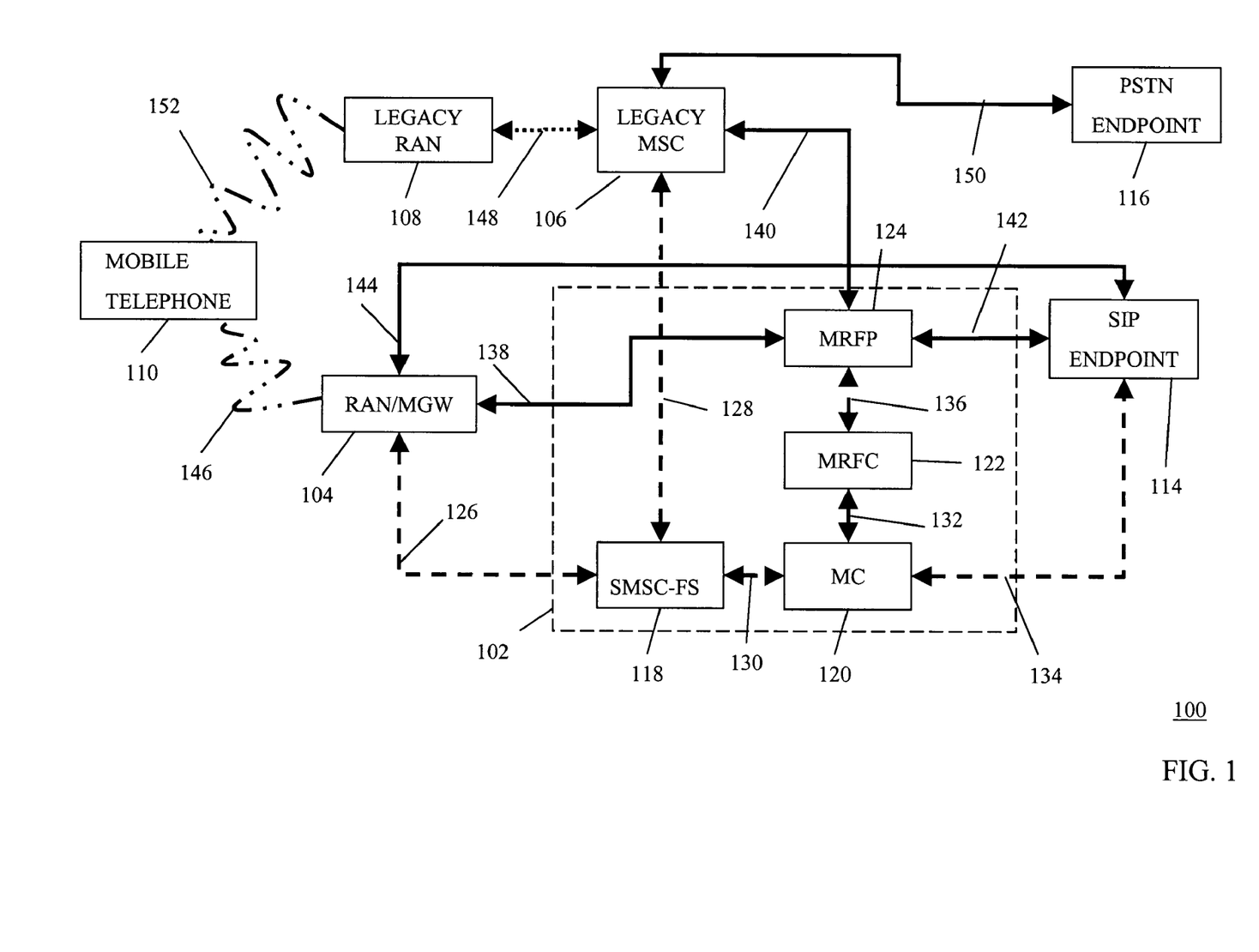
FIG. 1 is a representation of one example of an apparatus that comprises one or more mobile switching centers, one or more radio networks, one or more legacy circuit mobile switching centers, one or more legacy radio networks, one or more mobile telephones, one or more session initiation protocol endpoints, and one or more public switched telephone network endpoints.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more mobile switching centers ("MSC") 102, one or more radio networks 104, one or more legacy circuit mobile switching centers ("LEGACY MSC") 106, and one or more legacy radio networks 108 that serve to provide a communication path between a mobile telephone 110 and one or more session initiation protocol ("SIP") endpoints 114 or one or more public switched telephone network ("PSTN") endpoints 116.

The mobile switching center 102 in one example comprises one or more server components 118, one or more media coordinators ("MC") 120, one or more media resource function controllers ("MRFC") 122, and one or more media resource function processors ("MRFP") 124. The server component 104 in one example comprises a serving mobile switching center feature server ("SMSC-FS") as described in the above-incorporated application Ser. No. 10/295,774. The server component 104 in one example comprises an instance of a recordable data storage medium 101, as described herein.

The server component 118 employs an interface 126 to communicate with the radio network 104. The interface 126 in one example comprises a 3GPP A interface, a 3GPP2 A1 interface, a 3GPP Iu-CS interface, or an H.248 interface. The server component 118 employs an interface 128 to communicate with the legacy circuit mobile switching center 106. The interface 128 in one example comprises an ANSI-41 signaling interface or a 3GPP mobile application part ("MAP") interface. The server component 118 employs an interface 130 to communicate with the media coordinator 120. The interface 130 in one example comprises a session initiation protocol network. For example, multiple session initiation protocol compatible components communicate through session initiation protocol messages via an internet protocol network. Exemplary session initiation protocol compatible components comprise the server component 118, the media coordinator 120, the media resource function controller 122, and others, as will be understood by those skilled in the art. The session initiation protocol messages in one example comprise session description protocol ("SDP") messages.

The media coordinator 120 in one example comprises a media coordinator as described in the above-incorporated application Ser. No. 10/295,774. The media coordinator 120 employs an interface 132 to communicate with the media resource function controller 122. The interface 132 in one example comprises a session initiation protocol network. The media coordinator 120 employs an interface 134 to communicate with the session initiation protocol endpoint 114. The interface 134 in one example comprises a session initiation protocol network.

The media resource function controller 122 in one example comprises a media resource function controller as described in the above-incorporated application Ser. No. 10/295,774. The media resource function controller 122 employs an interface 136 to communicate with the media resource function processor 124. The interface 136 in one example comprises an H.248 interface.

The media resource function processor 124 in one example comprises a media resource function processor as described in the above-incorporated application Ser. No. 10/295,774. The media resource function processor 124 employs an interface 138 to provide a communication path to the radio network 104. The interface 138 in one example comprises a packet-switched communication path. The media resource function processor 124 employs an interface 140 to provide a communication path to the legacy circuit mobile switching center 106. The interface 140 in one example comprises a circuit-switched handoff facility. The circuit-switched handoff facility in one example supports intra-system and/or inter-system handoffs. The circuit-switched handoff facility in one example comprises an inter-vendor trunk ("IVT"). In a further example, the interface 140 comprises a circuit-switched communication path. The media resource function processor 124 employs an interface 142 to provide a communication path to the session initiation protocol endpoint 114. The interface 142 in one example comprises a packet-switched communication path. The media resource function processor 124 in one example performs a translation between the interface 140 and the interfaces 138 and 142. For example, the media resource function processor 124 performs a translation between a packet-switched portion of the mobile switching center 102 and a circuit-switched portion of the legacy circuit mobile switching center 106.

The radio network 104 in one example comprises a radio access network ("RAN") as described in the above-incorporated application Ser. No. 10/295,774. In another example, the radio network 104 comprises a radio access network and a media gateway ("RAN/MGW") as described in the above-incorporated application Ser. No. 10/295,774. The radio network 104 employs an interface 144 to provide a communication path to the session initiation protocol endpoint 114. The interface 144 in one example comprises a packet-switched communication path. The radio network 104 employs an interface 146 to provide a communication path to the mobile telephone 110. The interface 146 in one example comprises a wireless air interface.

The legacy circuit mobile switching center 106 employs an interface 148 to communicate with the legacy radio network 108. The interface 148 in one example comprises a signaling and media path to the legacy radio network 108. In a further example, the interface 148 comprises a circuit-switched communication path. The interface 148 in one example comprises a 3GPP A interface, one or more 3GPP2

A interfaces, or a 3GPP Iu-CS interface. The legacy circuit mobile switching center 106 employs an interface 150 to communicate with the public switched telephone network endpoint 116. The interface 150 in one example comprises a signaling and media path to the public switched telephone network endpoint 116. In a further example, the interface 150 comprises a circuit-switched communication path. The interface 150 in one example comprises an integrated services digital network user part ("ISUP") interface. The legacy radio network 108 employs an interface 152 to communicate with the mobile telephone 110. The interface 152 in one example comprises a wireless air interface.

The session initiation protocol endpoint 114 comprises an endpoint for signaling paths and media paths of an active call. For example, the session initiation protocol endpoint 114 in one example comprises a session initiation protocol compatible mobile or landline telephone. In another example, the session initiation protocol endpoint 114 comprises a media coordinator 120 as a component of the mobile switching center 102 or a different mobile switching center (not shown). In yet another example, the session initiation protocol endpoint 114 comprises a media gateway control function (not shown), a media gateway (not shown), and a portion of a public switched telephone network ("PSTN") (not shown).

The mobile switching center 102 and the legacy circuit mobile switching center 106 in one example serve to provide a communication path to the mobile telephone 110 from the session initiation protocol endpoint 114 or the public switched telephone network endpoint 116. As a user of the mobile telephone 110 travels between coverage areas of the mobile switching center 102 and the legacy circuit mobile switching center 106, the mobile switching center 102 and the legacy circuit mobile switching center 106 perform a handoff of an active call between the mobile telephone 110 and the session initiation protocol endpoint 114 or public switched telephone network endpoint 116, as will be understood by those skilled in the art. In one example, the mobile switching center 102 and the legacy circuit mobile switching center 106 comprise separate mobile switching centers and perform an inter-system handoff of the active call. In another example, the mobile switching center 102 and the legacy circuit mobile switching center 106 comprise a same mobile switching center and perform an intra-system handoff of the active call.

Turning to FIGS. 2-6, message flows 202, 302, 402, 502, and 602 comprise exemplary handoff and handback scenarios. One or more of the server component 118, the media coordinator 120, and the media resource function controller 122 may be combined. One or more steps may be replaced by equivalent functions, as will be appreciated by those skilled in the art. The message flows 202, 302, 402, 502, and/or 602 comprise one or more codecs. Exemplary codecs comprise enhanced variable rate codec ("EVRC"), 13-kilobit version ("13k"), selectable mode vocoder ("SMV"), G.711, and others, as will be appreciated by those skilled in the art. The message flows 202, 302, 402, 502, and/or 602 comprise one or more directionalities. Directionalities describe available directions for media flow, for example, inactive ("inactive"), send only ("sendonly"), receive only ("recvonly"), and send and receive ("sendrecv").

The message flows 202, 302, 402, 502, and 602 comprise multiple steps. A given step is numbered in an exemplary chronological order. Exemplary dependencies of a given step are shown in brackets. For example, "5. {0}" indicates that, in one exemplary implementation, Step 5 requires Step 0 to complete before Step 5 can begin. Alternative dependencies and additional dependencies may be employed, as will be appreciated by those skilled in the art. Where the mobile switching center 102 and the legacy circuit mobile switching center 106 comprise a same mobile switching center and perform an intra-system handoff, the exemplary steps that comprise ANSI-41 messages are omitted from the message flows 202, 302, 402, 502, and/or 602. Steps that are dependent on an exemplary step that comprises an ANSI-41 message employ the dependency of the exemplary step that comprises the ANSI-41 message and/or the equivalent function within the mobile switching center 102, as will be appreciated by those skilled in the art. For example, in an intra-system handoff, Step 40 of FIG. 2 comprises a dependency on Step 25.

Figure 2:
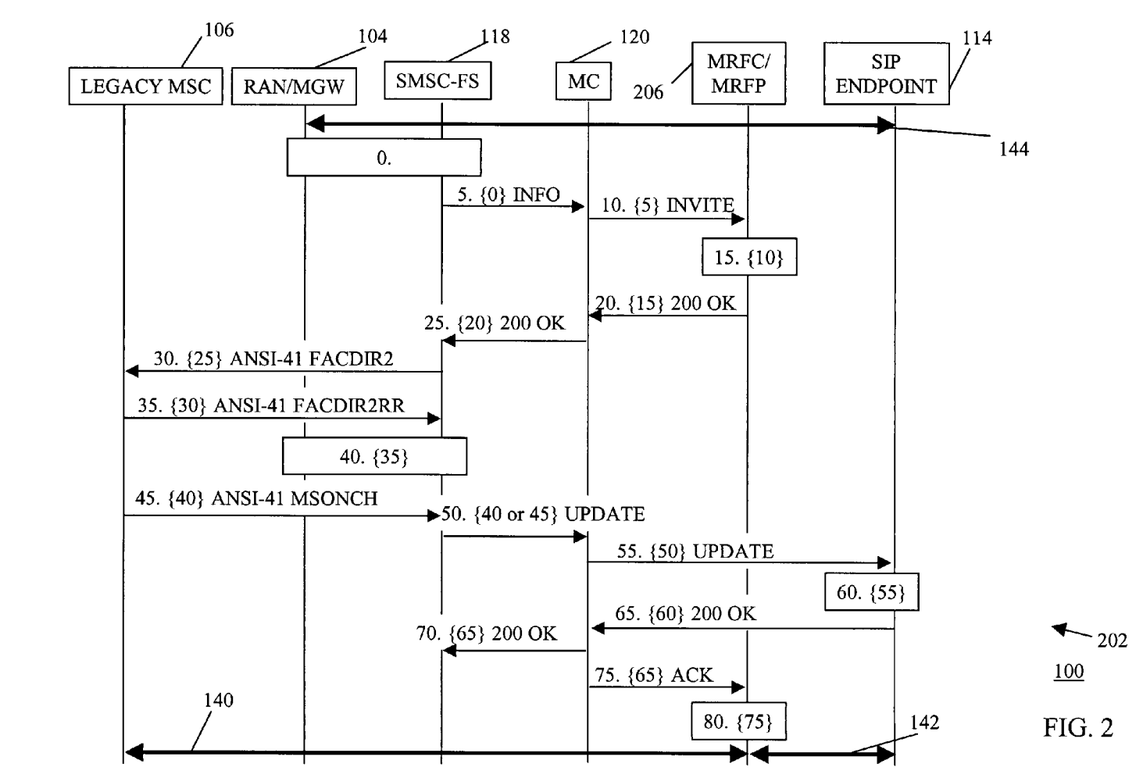
FIG. 2 is a representation of an exemplary message flow of a handoff from a packet-switched portion of the mobile switching center to a circuit-switched portion of the legacy circuit mobile switching center of FIG. 1.

Referring to FIG. 2, a message flow 202 comprises an exemplary handoff of an active call between the mobile telephone 110 and the session initiation protocol endpoint 114. The active call comprises a packet-switched portion of the mobile switching center 102. The mobile switching center 102 hands off the active call to a circuit-switched portion of the legacy circuit mobile switching center 106. For example, the message flow 202 comprises a handoff from the interfaces 146 and 144 to the interfaces 142, 140, 148, and 152. The mobile switching center 102 in one example comprises a serving mobile switching center and the legacy circuit mobile switching center 106 comprises a target mobile switching center, as will be understood by those skilled in the art. One or more network resources ("MRFP/MRFC") 206 comprise one or more media resource function controllers 122, one or more media resource function processors 124, and one or more interfaces 136.

The server component 118 initiates the handoff (Step 0) of the active call with the radio network 104 and the mobile telephone 110. The server component 118 then sends one or more signals (Step 5) to the media coordinator 120 to cause an allocation of one or more network resources 206. The one or more network resources 206 in one example comprises an endpoint for the interface 140. The signal of Step 5 in one example comprises a session initiation protocol INFO message. The media coordinator 120 sends one or more signals (Step 10) to the network resource 206 to cause an allocation of the network resources 206 (Step 15). The signal of Step 10 in one example comprises a session initiation protocol INVITE message. The session initiation protocol INVITE message in Step 10 in one example does not comprise session description protocol ("SDP") information. The network resources 206 then send one or more signals (Step 20) to the media coordinator 120 to confirm the allocation of the network resources 206. The signal of Step 20 in one example comprises a session initiation protocol "200 OK" message. In a further example, the signal of Step 20 comprises one or more parameters for continuing the handoff, as will be appreciated by those skilled in the art. Exemplary parameters comprise a circuit identification code ("CIC") for the interface 140, a codec for the interface 140, one or more available codecs for the interface 142, one or more directionalities for the interfaces 140 and 142, and an internet protocol address of the network resources 206 through the interface 142. For example, the directionalities of the interface 140 and 142 comprise a send and receive directionality. The media coordinator 120 then sends one or more signals (Step 25) to the server component 118 to confirm the allocation of the network resources 206. The signal of Step 25 in one example comprises a session initiation protocol "200 OK" message. In a further example, the signal of Step 25 comprises the circuit identification code for the interface 140.

The server component 118 then sends one or more signals (Step 30) to the legacy circuit mobile switching center 106 to prepare to receive the handoff of the mobile telephone. The signal of Step 30 in one example comprises an ANSI-41 FACDIR2 message. In a further example, the signal of Step 30 comprises the circuit identification code for the interface 140. The legacy mobile switching center 106 prepares to receive the handoff and then sends one or more signals (Step 35) to the server component 118 to begin the handoff of the mobile telephone. The signal of Step 35 in one example comprises an ANSI-41 FACDIR2RR message. The server component 118 cooperates with the radio network 104 to hand over the mobile telephone (Step 40) to the legacy circuit mobile switching center 106 using well-known procedures, as will be understood by those skilled in the art. The legacy circuit mobile switching center 106 confirms the handover of the mobile telephone by sending one or more signals (Step 45) to the server component 118. The signal of Step 45 in one example comprises an ANSI-41 MSONCH message.

Upon handing over the mobile telephone to the legacy circuit mobile switching center (Step 40) or receiving the confirmation of the handover (Step 45), the server component 118 in one example sends one or more signals (Step 50) to the media controller 120 to cause a configuration of the session initiation protocol endpoint 114. The signal of Step 50 in one example comprises a session initiation protocol UPDATE message. The signal of Step 50 in one example comprises one or more parameters for indicating that the interface 144 is no longer valid for media. For example, setting a port number for the interface 144 equal to zero indicates that the interface 144 is no longer valid for media, as will be appreciated by those skilled in the art. Other known procedures may also be used for indicating that the interface 144 is no longer valid for media. The media coordinator 120 sends one or more signals (Step 55) to the session initiation protocol endpoint 114 to configure the session initiation protocol endpoint 114. The signal of Step 55 in one example comprises a session initiation protocol UPDATE message. In a further example, the signal of Step 55 comprises one or more parameters for performing a configuration of the session initiation protocol endpoint 114. Exemplary parameters comprise the internet protocol address of the network resources 206 through the interface 142, the available codecs for the interface 142, and the directionality of the interface 142. For example, the directionality of the interface 142 comprises a send and receive directionality. The session initiation protocol endpoint 114 employs the signal of Step 55 to perform a configuration (Step 60). The session initiation protocol endpoint 114 sends one or more signals (Step 65) to confirm the configuration of the session initiation protocol endpoint 114. The signal of Step 65 in one example comprises a session initiation protocol "200 OK" message. In a further example, the signal of Step 65 comprises an internet protocol address of the session initiation protocol endpoint 114 through the interface 142, a codec for the interface 142, and the directionality for the interface 142. Steps 55, 60, and 65 in one example comprise an end-to-end codec negotiation, as described in the above-incorporated application Ser. No. 10/295,775. The media coordinator 120 then sends one or more signals (Step 70) to the server component 118 to confirm the configuration of the session initiation protocol endpoint 114. The signal of Step 70 in one example comprises a session initiation protocol "200 OK" message. In a further example, the signal of Step 70 comprises one or more parameters to confirm the configuration, as will be appreciated by those skilled in the art Upon receiving the confirmation of the configuration of the session initiation protocol endpoint 114 (Step 65), the media coordinator 120 sends one or more signals (Step 75) to the network resources 206 to cause an activation of the network resources 206. The signal of Step 75 in one example comprises a session initiation protocol ACK message. In a further example, the signal of Step 75 comprises one or more parameters for activation of the network resources 206. Exemplary parameters comprise the circuit identification code for the interface 140, the codecs of the interfaces 142 and 140, and the directionality of the interfaces 142 and 140. For example, the directionalities of the interfaces 142 and 140 comprise a send and receive directionality. The network resources 206 then employ the signal of Step 75 to perform an activation (Step 80) of the network resources 206. Steps 55, 60, 65, 75, and 80 in another example occur after Step 20 and concurrently with Steps 30, 35, 40, and 45 to promote an increase in efficiency of the handoff.

Figure 3:
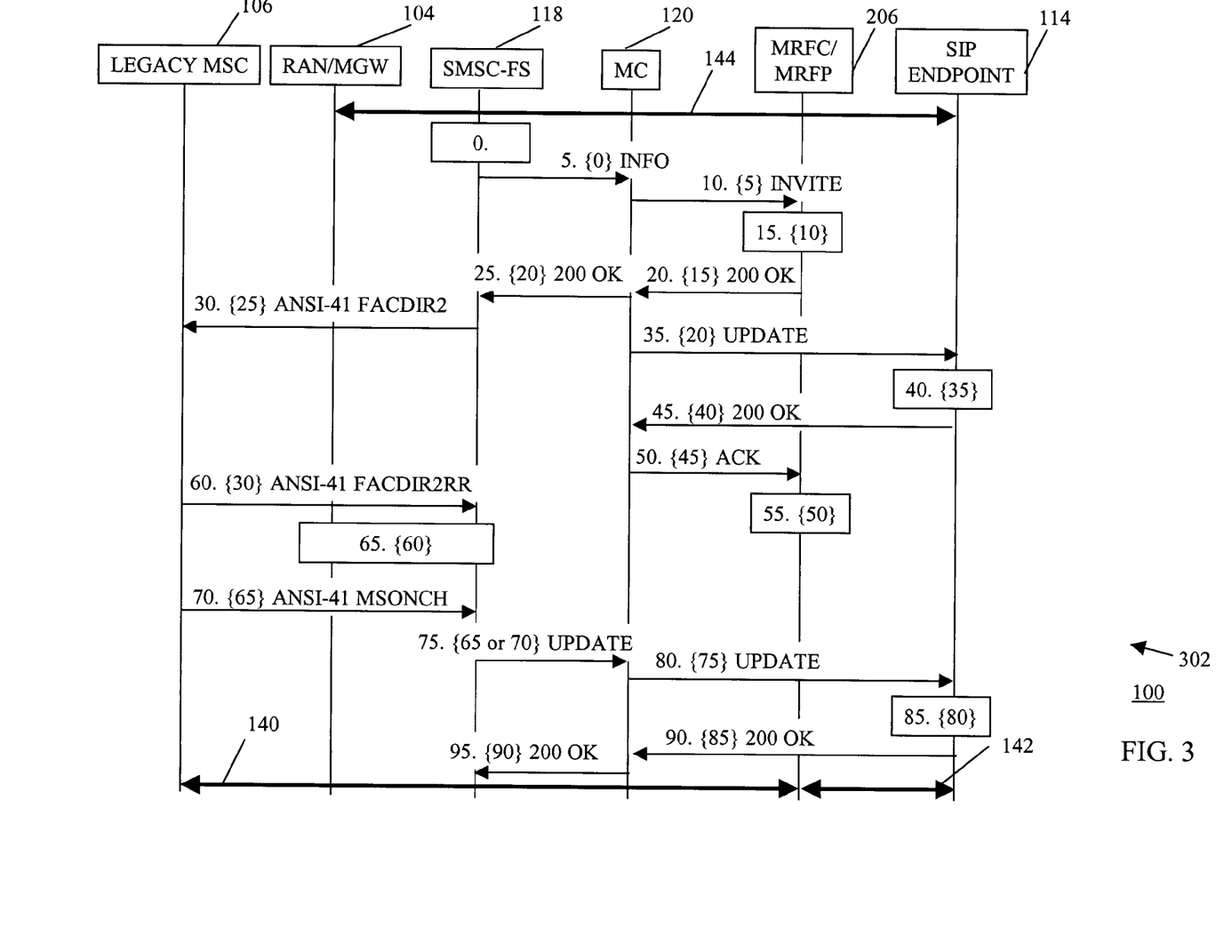
FIG. 3 is a representation of another exemplary message flow of the handoff from a packet-switched portion of the mobile switching center to a circuit-switched portion of the legacy circuit mobile switching center of FIG. 1.

Referring to FIG. 3, a message flow 302 comprises another exemplary handoff of the active call between the mobile telephone 110 and the session initiation protocol endpoint 114. The active call comprises a packet-switched portion of the mobile switching center 102. The mobile switching center 102 hands off the active call to a circuit-switched portion of the legacy circuit mobile switching center 106. For example, the message flow 302 comprises a handoff from the interfaces 146 and 144 to the interfaces 142, 140, 148, and 152. Steps 0, 5, 10, 15, 20, 25, and 30 occur analogous to message flow 202. The media coordinator 120 then sends one or more signals (Step 35) to the session initiation protocol endpoint 114 to perform a configuration. The signal of Step 35 in one example comprises a session initiation protocol UPDATE message. In a further example, the signal of Step 35 comprises a request to allocate a new media line for the active call. In a still further example, the signal of Step 35 comprises one or more parameters for allocation of the new media line. The new media line in one example comprises the interface 142. Exemplary parameters comprise an internet protocol address of the network resources 206 through the interface 142, the available codecs for the interface 142, the directionality of the interface 142, and one or more previously established parameters for the interface 144, as will be appreciated by those skilled in the art. For example, the directionality of the interface 142 comprises an inactive directionality. The session initiation protocol endpoint 114 employs the signal of Step 35 to perform the configuration (Step 40). The session initiation protocol endpoint 114 then sends one or more signals (Step 45) to the media coordinator 120 to confirm the configuration. The signal of Step 45 in one example comprises a session initiation protocol "200 OK" message. In a further example, the signal of Step 45 comprises one or more parameters for confirmation of the configuration. Exemplary parameters comprise an internet protocol address of the session initiation protocol endpoint 114 through the interface 142, a codec for the interface 142, the directionality for the interface 142, and the previously established parameters for the interface 144. Steps 35, 40, and 45 in one example comprise an end-to-end codec negotiation, as described in the above-incorporated application Ser. No. 10/295,775.

Upon confirmation of the configuration (Step 45), the media coordinator 120 sends one or more signals (Step 50) to the network resources 206 to cause an activation of the network resources 206 for the active call. The signal of Step 50 in one example comprises a session initiation protocol ACK message. The signal of Step 50 in a further example comprises one or more parameters for activation of the network resources 206. Exemplary parameters comprise the circuit identification code for the interface 140, the codec of the interface 140, the codec of the interface 142, the internet protocol address of the session initiation protocol endpoint 114 through the interface 142, and the directionality of the interfaces 140 and 142. The network resources 206 employ the signal of Step 50 to perform the activation (Step 55).

Upon receipt of the signal of Step 30, the legacy circuit mobile switching center 106 prepares to receive the mobile telephone on a new channel, and then sends one or more signals (Step 60) to the server component 118. The signal of Step 60 in one example comprises an ANSI-41 FACDIR2RR message. The server component 118 hands off the mobile telephone (Step 65) to the legacy circuit mobile switching center 106 upon receipt of the signal of Step 60. The legacy circuit mobile switching center 106 confirms the handover of the mobile telephone by sending one or more signals (Step 70) to the server component 118. The signal of Step 70 in one example comprises an ANSI-41 MSONCH message.

Upon handing over the mobile telephone to the legacy circuit mobile switching center (Step 65) or receiving the confirmation of the handover (Step 70), the server component 118 in one example sends one or more signals (Step 75) to the media controller 120 to cause a configuration of the session initiation protocol endpoint 114. The signal of Step 75 in one example comprises a session initiation protocol UPDATE message. The signal of Step 75 in one example comprises one or more parameters for indicating that the interface 144 is no longer valid for media. For example, setting a port number for the interface 144 equal to zero indicates that the interface 144 is no longer valid for media, as will be appreciated by those skilled in the art. Other known procedures may also be used for indicating that the interface 144 is no longer valid for media. The media coordinator 120 sends one or more signals (Step 80) to the session initiation protocol endpoint 114 to configure the session initiation protocol endpoint 114. The signal of Step 80 in one example comprises a session initiation protocol UPDATE message. In a further example, the signal of Step 80 comprises one or more parameters for configuration of the session initiation protocol endpoint 114 and for indicating that the interface 144 is no longer valid for media. Exemplary parameters comprise the internet protocol address of the network resources 206 through the interface 142, the codec for the interface 142, the directionality of the interface 142, and the port number for the interface 144 equal to zero. For example, the directionality of the interface 142 comprises a send and receive directionality. The session initiation protocol endpoint 114 employs the signal of Step 80 to perform a configuration (Step 85) of the session initiation protocol endpoint 114. For example, the session initiation protocol endpoint 114 transfers the active call to the interface 142 and releases the interface 144, as will be appreciated by those skilled in the art.

The session initiation protocol endpoint 114 sends one or more signals (Step 90) to confirm the configuration of the session initiation protocol endpoint 114. The signal of Step 90 in one example comprises a session initiation protocol 200 OK message. In a further example, the signal of Step 90 comprises one or more parameters for confirming the configuration and/or release of the interface 144. Exemplary parameters comprise an internet protocol address of the session initiation protocol endpoint 114 through the interface 142, the codec for the interface 142, and the directionality of the interface 142. The directionality in one example comprises a send and receive directionality. The media coordinator 120 sends one or more signals (Step 95) to the server component 118 to confirm the transfer of the active call to the new media line. The signal of Step 95 in one example comprises a session initiation protocol "200 OK" message. In a further example, the signal of Step 95 comprises one or more parameters to confirm the configuration, as will be appreciated by those skilled in the art.

Figure 4:
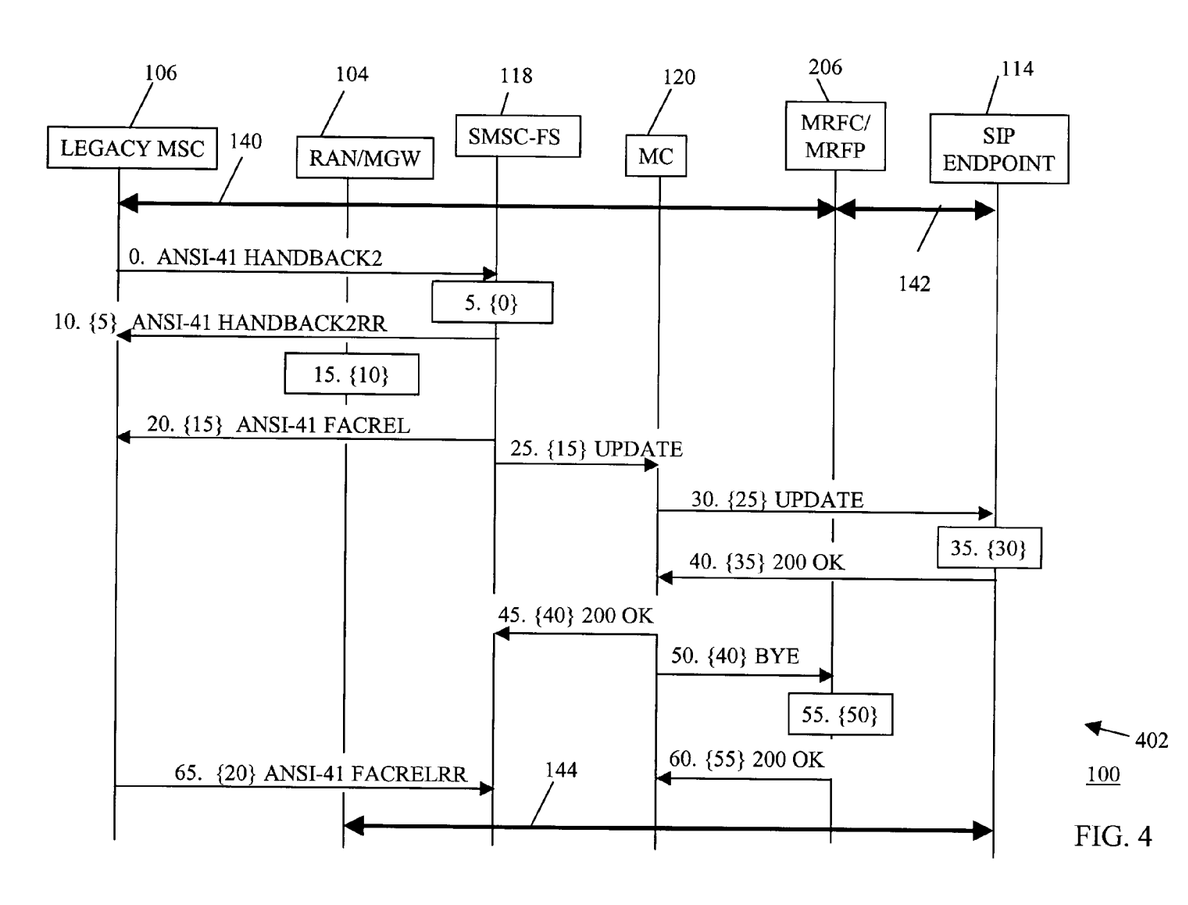
FIG. 4 is a representation of an exemplary message flow of a handback following the message flow of FIG. 2 or FIG. 3.

Referring to FIG. 4, a message flow 402 comprises an exemplary handback of the active call from the message flow 202 or 302. The message flow 402 comprises a handback from the circuit-switched portion of the legacy circuit mobile switching center 106 to the packet-switched portion of the mobile switching center 102. For example, the message flow 402 comprises a handback from the interfaces 152, 148, 140, and 142 to the interfaces 146 and 144. The server component 118 comprises an anchor and target mobile switching center, and the legacy circuit mobile switching center 106 comprises a serving mobile switching center, as will be understood by those skilled in the art.

The server component 118 receives one or more signals (Step 0) to begin the handback of the active call to the mobile switching center 102. The signal of Step 0 in one example comprises an ANSI-41 HANDBACK2 message. The server component 118 cooperates with the radio network 104 to prepare (Step 5) for the handback. The server component 118 then sends one or more signals (Step 10) to the legacy circuit mobile switching center 106 to begin the handback. The signal of Step 10 in one example comprises an ANSI-41 HANDBACK2RR message. The legacy circuit mobile switching center 106 hands back the mobile telephone and the mobile telephone arrives on a new channel of the radio network 104 (Step 15). The server component then sends one or more signals (Step 20) to the legacy circuit mobile switching center 106 to release one or more network resources of the legacy circuit mobile switching center 106. The signal of Step 20 in one example comprises an ANSI-41 FACREL message. The legacy circuit mobile switching center 106 sends one or more signals (Step 65) to the server component 118 to confirm the release of the network resources of the legacy circuit mobile switching center 106. The signal of Step 65 in one example comprises an ANSI-41 FACRELRR message.

Upon the handback of the mobile telephone (Step 15), the server component 118 sends one or more signals (Step 25) to the media coordinator 120 to cause a configuration of the session initiation protocol endpoint 114. The signal of Step 25 in one example comprises a session initiation protocol UPDATE message. In a further example, the signal of Step 25 comprises one or more parameters for the configuration. Exemplary parameters comprise an internet protocol address of the radio network 104 through the interface 144, one or more available codecs for the interface 144, and a directionality of the interface 144. For example, the directionality of the interface 144 comprises a send and receive directionality. The media coordinator 120 sends one or more signals (Step 30) to the session initiation protocol endpoint 114 to configure the session initiation protocol endpoint 114. The signal of Step 30 in one example comprises a session initiation protocol UPDATE message. In a further example, the signal of Step 30 comprises the one or more parameters from the signal of Step 25. The session initiation protocol endpoint 114 employs the signal of Step 30 to perform the configuration (Step 35). The session initiation protocol endpoint 114 then sends one or more signals (Step 40) to the media coordinator 120 to confirm the configuration. The signal of Step 40 in one example comprises a session initiation protocol "200 OK" message. In a further example, the signal of Step 40 comprises one or more parameters to confirm the configuration, as will be appreciated by those skilled in the art. Exemplary parameters comprise an internet protocol address of the session initiation protocol endpoint 114 through the interface 144, a codec for the interface 144, and the directionality of the interface 144. Steps 30, 35, and 40 in one example comprise an end-to-end codec negotiation, as described in the above-incorporated application Ser. No. 10/295,775. The media coordinator 120 sends one or more signals (Step 45) to the server component 118 to confirm the configuration of the session initiation protocol endpoint 114. The signal of Step 45 in one example comprises a session initiation protocol "200 OK" message. In a further example, the signal of Step 45 comprises one or more parameters. Exemplary parameters comprise the parameters of the signal of Step 40.

Upon confirmation of the configuration of the session initiation protocol endpoint 114 (Step 40), the media coordinator 120 sends one or more signals (Step 50) to cause a release of the network resources 206. The signal of Step 50 in one example comprises a session initiation protocol BYE message. The network resources 206 perform the release (Step 55) and send one or more signals (Step 60) to the media coordinator 120 to confirm the release. The signal of Step 60 in one example comprises a session initiation protocol "200 OK" message. In a further example, the signal of Step 60 comprises one or more parameters to confirm the release, as will be appreciated by those skilled in the art Referring to FIG. 5, a message flow 502 comprises an exemplary handoff of an active call between the mobile telephone 110 and the public switched telephone network endpoint 116. The active call comprises a circuit-switched portion of the legacy circuit mobile switching center 106. The legacy circuit mobile switching center 106 hands off the active call to a packet-switched portion of the mobile switching center 102. For example, the message flow 502 comprises a handoff from the interfaces 152, 148, and 150 to the interfaces 146, 138, 140, and 150. The legacy circuit mobile switching center 106 comprises a serving mobile switching center, and the mobile switching center 102 comprises a target mobile switching center, as will be understood by those skilled in the art.

Figure 5:
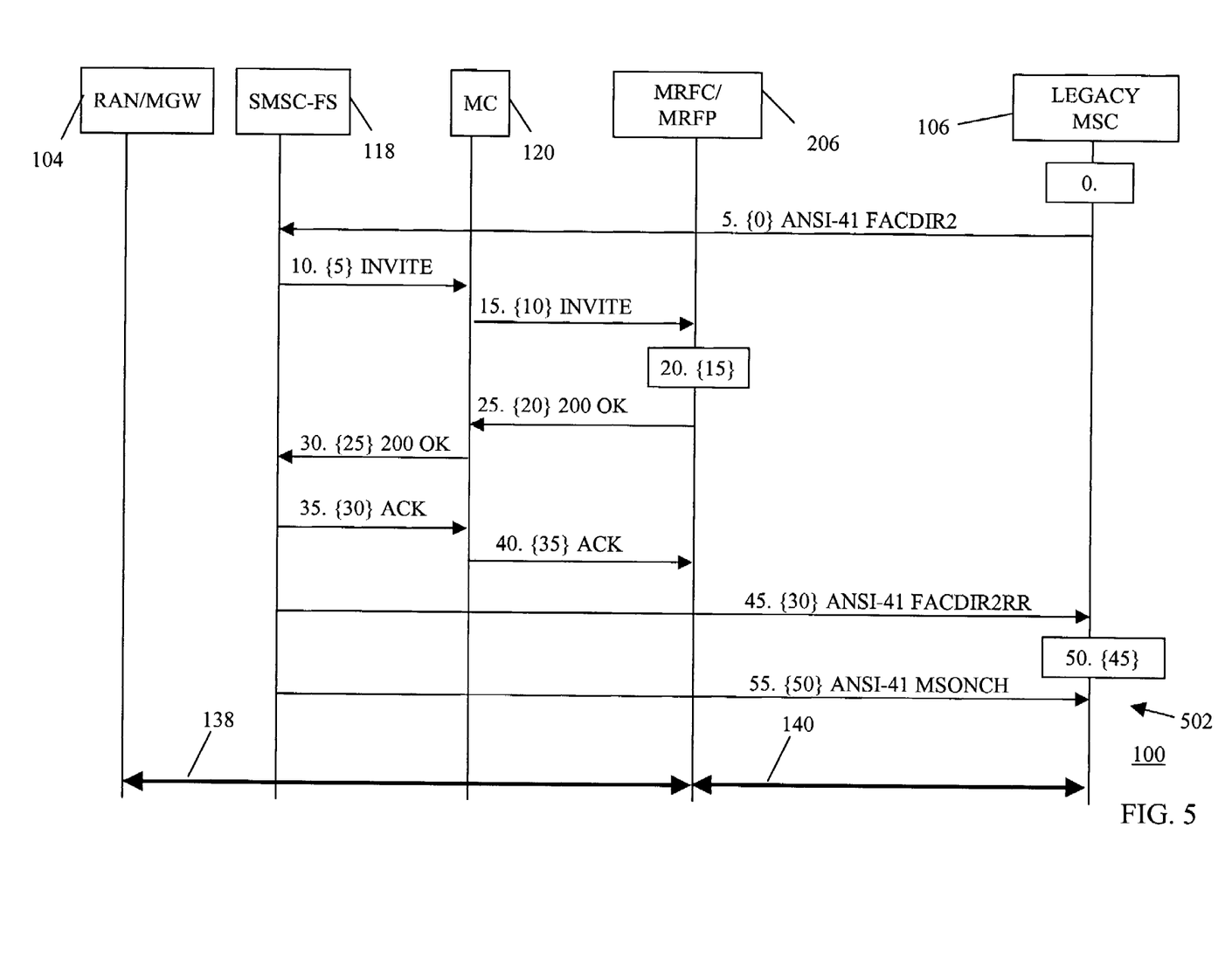
FIG. 5 is a representation of an exemplary message flow of a handoff from a circuit-switched portion of the legacy circuit mobile switching center to a packet-switched portion of the mobile switching center of FIG. 1.

The legacy circuit mobile switching center 106 initiates the handoff (Step 0) of the mobile telephone. The legacy circuit mobile switching center 106 in one example allocates the interface 140 and obtains a circuit identification code for the interface 140. The server component 118 receives one or more signals (Step 5) from the legacy circuit mobile switching center 106 to prepare for the handoff. The signal of Step 5 in one example comprises an ANSI-41 FACDIR2 message. In a further example, the signal of Step 5 comprises one or more parameters for performing the handoff. Exemplary parameters comprise the circuit identification code for the interface 140 and a codec for the interface 140. The server component 118 sends one or more signals (Step 10) to the media coordinator 120 to cause an allocation of one or more network resources 206. The signal of Step 10 in one example comprises a session initiation protocol INVITE message. In a further example, the signal of Step 10 comprises one or more parameters for allocation of the network resources 206. Exemplary parameters comprise an internet protocol address of the radio network 104 through the interface 138, one or more available codecs for the interface 138, a directionality of the interface 138, and one or more of the parameters of the signal of Step 5, for example, the circuit identification code for the interface 140. The media coordinator 120 sends one or more signals (Step 15) to the network resources 206 to cause an allocation of the network resources 206 (Step 20). The signal of Step 15 in one example comprises a session initiation protocol INVITE message. The signal of Step 15 in a further example comprises one or more parameters for allocation of the network resources 206. Exemplary parameters comprise the parameters of the signal of Step 10. The network resources 206 send one or more signals (Step 25) to the media coordinator 120 to confirm the allocation of the network resources 206. The signal of Step 25 in one example comprises a session initiation protocol "200 OK" message. In a further example, the signal of Step 25 comprises one or more parameters for confirmation of the allocation of the network resources 206. Exemplary parameters comprise an internet protocol address of the network resources 206 through the interface 138, a codec for the interface 138, and the directionality of the interface 138.

Upon confirmation (Step 25) of the allocation, the media coordinator 120 sends one or more signals (Step 30) to the server component 118 to confirm the signal of Step 10. The signal of Step 30 in one example comprises a session initiation protocol "200 OK" message. In a further example, the signal of Step 30 comprises one or more parameters for confirmation of the allocation. Exemplary parameters comprise the parameters of the signal of Step 25. The server component 118 sends one or more signals (Step 35) to confirm the signal from Step 30. The signal of Step 35 in one example comprises a session initiation protocol ACK message. The media coordinator 120 sends one or more signals (Step 40) to the network resources 206 to confirm the signal from Step 25. The signal of Step 40 in one example comprises a session initiation protocol ACK message.

The server component 118 sends one or more signals (Step 45) to the legacy circuit mobile switching center 106 to confirm the signal of Step 5. The signal of Step 45 in one example comprises an ANSI-41 FACDIR2RR message. The legacy circuit mobile switching center 106 hands off the mobile telephone to the mobile switching center 102 (Step 50). Upon the handoff of the mobile telephone (Step 50), the server component 118 sends one or more signals (Step 60) to the legacy circuit mobile switching center 106 to confirm the handoff. The signal of Step 60 in one example comprises an ANSI-41 MSONCH message.

Figure 6:
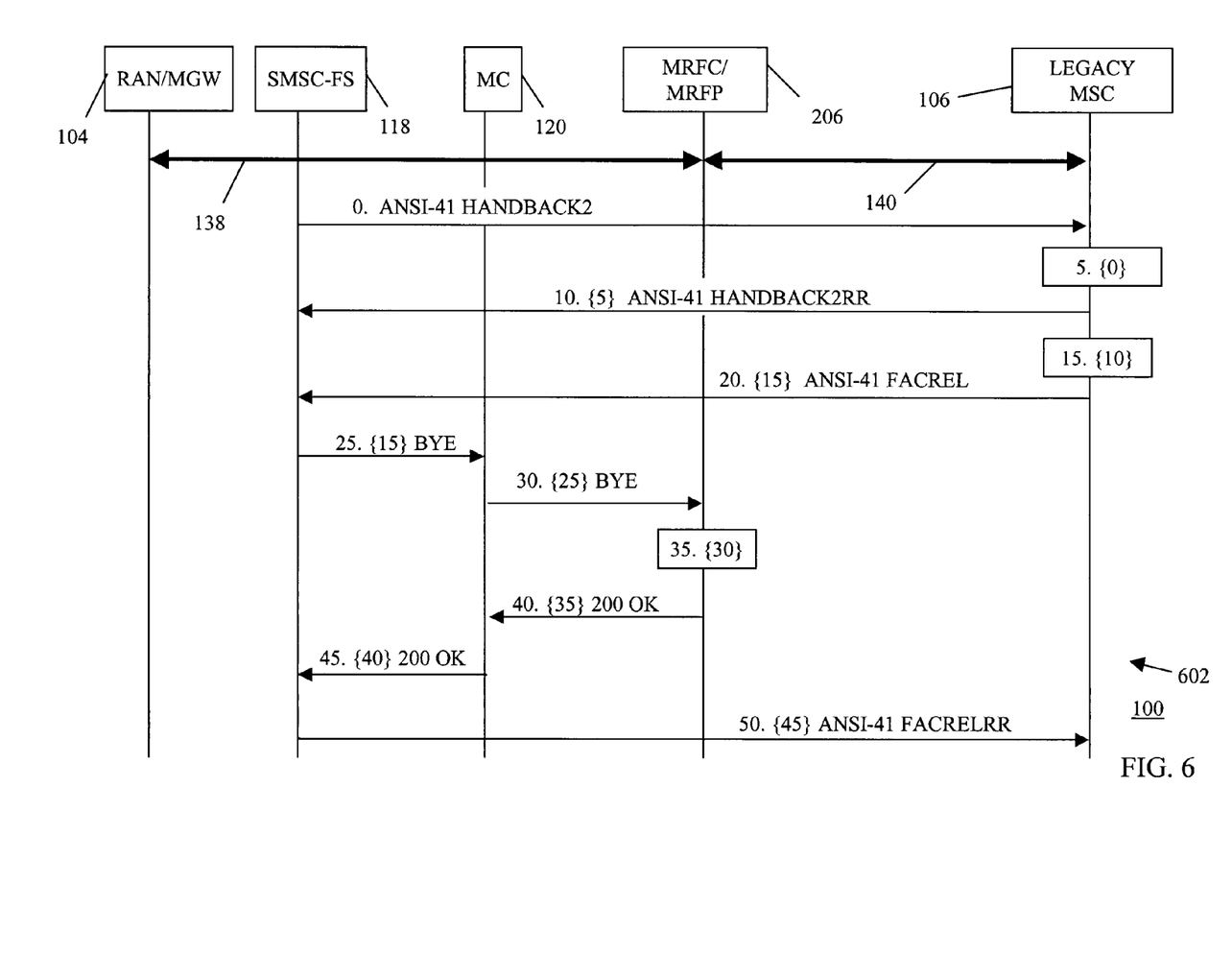
FIG. 6 is a representation of an exemplary message flow of a handback following the message flow of FIG. 5.

Referring to FIG. 6, a message flow 602 comprises an exemplary handback of the active call from the message flow 502. The message flow 602 comprises a handback from the packet-switched portion of the mobile switching center 102 to the circuit-switched portion of the legacy circuit mobile switching center 106. For example, the message flow 602 comprises a handback from the interfaces 146, 138, 140, and 150 to the interfaces 152, 148, and 150. The mobile switching center 102 comprises a serving mobile switching center, and the legacy circuit mobile switching center 106 comprises an anchor and target mobile switching center, as will be understood by those skilled in the art. The server component 118 initiates the handback by sending one or more signals (Step 0) to the legacy circuit mobile switching center 106. The signal of Step 0 in one example comprises an ANSI-41 HANDBACK2 message.

The legacy circuit mobile switching center 106 prepares for the handback of the active call (Step 5) and sends one or more signals (Step 10) to the server component 118 to initiate the handoff. The signal of Step 10 in one example comprises an ANSI-41 HANDBACK2RR message. Upon the handoff of the mobile telephone (Step 15), the legacy circuit mobile switching center 106 sends one or more signals (Step 20) to the server component 118 to cause a release of the network resources 206. The signal of Step 20 in one example comprises an ANSI-41 FACREL message. The server component 118 then sends one or more signals (Step 25) to the media coordinator 120 to release the network resources 206. The signal of Step 25 in one example comprises a session initiation protocol BYE message.

The media coordinator 120 sends one or more signals (Step 30) to the network resources 206 to cause the release (Step 35) of the network resources 206. The signal of Step 50 in one example comprises a session initiation protocol BYE message. The network resources 206 send one or more signals (Step 40) to the media coordinator 120 to confirm the release of the network resources 206. The signal of Step 40 in one example comprises a session initiation protocol "200 OK" message. The media coordinator 120 sends one or more signals (Step 45) to the server component 118 to confirm the release of the network resources 206. The signal of Step 65 in one example comprises a session initiation protocol "200 OK" message. The server component 118 then sends one or more signals (Step 50) to the legacy circuit mobile switching center 106 to confirm the release of the network resources 206. The signal of Step 50 in one example comprises an ANSI-41 FACRELRR message.

The apparatus 100 in one example employs one or more computer-readable signal-bearing media. An example of a computer-readable signal-bearing medium for the apparatus 100 comprises the recordable data storage medium 101 of the server component 118. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a server component that sends one or more session initiation protocol (SIP) messages, to cause an allocation of one or more network resources for an active call terminated to a mobile telephone without session description protocol (SDP) information, upon initiation of a handoff of the active call between a packet-switched portion of a mobile switching center and a circuit-switched portion of a mobile switching center, wherein the one or more network resources provide a translation between the packet-switched portion of the mobile switching center and the circuit-switched portion of the mobile switching center.

2. The apparatus of claim 1, wherein the handoff of the active call comprises a handoff from the packet-switched portion of the mobile switching center to the circuit-switched portion of the mobile switching center;
wherein the server component comprises a portion of the mobile switching center that comprises the packet-switched portion;
wherein the server component sends one or lucre session initiation protocol UPDATE messages to configure one or more session initiation protocol endpoints for the handoff from the packet-switched portion of the mobile switching center to the circuit-switched portion of the mobile switching center.

3. The apparatus of claim 2, wherein the server component employs one or more ANSI-41 signals to communicate with the mobile switching center that comprises the circuit-switched portion.

4. The apparatus of claim 2, wherein the mobile switching center that comprises the packet-switched portion and the mobile switching center that comprises the circuit-switched portion comprise a same mobile switching center.

5. The apparatus of claim 2, wherein the server component signals to configure the one or more session initiation protocol endpoints upon initiation of a handback of the active call from the circuit-switched portion of the mobile switching center to the packet-switched portion of the mobile switching center;
wherein the server component signals to release one or more of the one or more network resources upon the initiation of the handback from the circuit-switched portion of the mobile switching center to the packet-switched portion of the mobile switching center.

6. The apparatus of claim 5, wherein the sewer component employs one or more ANSI-41 signals to communicate with the mobile switching center that comprises the circuit-switched portion.

7. The apparatus of claim 5, wherein the mobile switching center that comprises the packet-switched portion and the mobile switching center that comprises the circuit-switched portion comprise a same mobile switching center.

8. The apparatus of claim 1, wherein the handoff of the active call comprises a handoff from the circuit-switched portion of the mobile switching center to the packet-switched portion of the mobile switching center;
wherein the server component comprises a portion of the mobile switching center that comprises the packet-switched portion.

9. The apparatus of claim 8, wherein the server component employs one or more ANSI-41 signals to communicate with the mobile switching center that comprises the circuit-switched portion.

10. The apparatus of claim 8, wherein the mobile switching center that comprises the packet-switched portion and the mobile switching center that comprises the circuit-switched portion comprise a same mobile switching center.

11. The apparatus of claim 8, wherein the server component signals to release the one or more network resources upon initiation of a handback from the packet-switched portion of the mobile switching center to the circuit-switched portion of the mobile switching center.

12. The apparatus of claim 11, wherein the server component employs one or more ANSI-41 signals to communicate with the mobile switching center that comprises the circuit-switched portion.

13. The apparatus of claim 11, wherein the mobile switching center that comprises the packet-switched portion and the mobile switching center that comprises the circuit-switched portion comprise a same mobile switching center.

14. A method, comprising the steps of:
- performing a handoff of an active call to a mobile telephone between a packet-switched portion of a mobile switching center and a circuit-switched portion of a mobile switching center;
- sending a session initiation protocol (SIP) message without session description protocol (SDP) information to cause an allocation of one or more network resources that provide a translation between the packet-switched portion of the mobile switching center and the circuit-switched portion of the mobile switching center;
- performing a handback of the active call between the packet-switched portion of the mobile switching center and the circuit-switched portion of the mobile switching center; and
- sending a signal to cause a release of one or more of the one or more network resources.

15. The method of claim 14, wherein the step of performing the handoff of the active call to the mobile telephone between the packet-switched portion of the mobile switching center and the circuit-switched portion of the mobile switching center comprises the steps of:
- sending a session initiation protocol UPDATE message to cause a configuration of one or more session initiation protocol endpoints to support the handoff of the active call from the packet-switched portion of the mobile switching center to the circuit-switched portion of the mobile switching center; and
- sending a signal to cause an activation of the one or more network resources.

16. The method of claim 15, further comprising the step of:
- sending one or more ANSI-41 signals to and receiving one or more ANSI-41 signals from the mobile switching center that comprises the circuit-switched portion.

17. The method of claim 15, wherein the session initiation protocol endpoint comprises a first media port for the active call, wherein the step of sending the signal to configure the one or more session initiation protocol endpoints to support the handoff of the active call from the packet-switched portion of the mobile switching center to the circuit-switched portion of the mobile switching center comprises the steps of:
- sending a session initiation protocol message to cause a configuration of a second media port of the session initiation protocol endpoint;
- sending a session initiation protocol message to cause the session initiation protocol endpoint to establish a connection between the second media port and the one or more network resources;
- sending a session initiation protocol message to cause an activation of the second media port; and
- sending a session initiation protocol message to cause a release of the first media port of the session initiation protocol endpoint.

18. The method of claim 14, further comprising the step of:
- sending one or more ANSI-41 signals to and receiving one or more ANSI-41 signals from the mobile switching center that comprises the circuit-switched portion to support the handoff from the circuit-switched portion of the mobile switching center to the packet-switched portion of the mobile switching center.

19. An article, comprising:
- one or more computer-readable signal-bearing media; and
- means in the one or more media for performing a handoff of an active call to a mobile telephone between a packet-switched portion of a mobile switching center and a circuit-switched portion of a mobile switching center;
- means in the one or more media for sending a session initiation protocol message without session description protocol (SDP) information to cause an allocation of one or more network resources that provide a translation between the packet-switched portion of the mobile switching center and the circuit-switched portion of the mobile switching center;
- means in the one or more media for performing a handback of the active call between the packet-switched portion of the mobile switching center and the circuit-switched portion of the mobile switching center; and
- means in the one or more media for sending a signal to cause a release of one or more of the one or more network resources.

20. The article of claim 19, further comprising:
- means in the one or more media for sending one or more ANSI-41 signals to and receiving one or more ANSI-41 signals from the mobile switching center that comprises the circuit-switched portion to support the handoff.

* * * * *